(No Model.) 2 Sheets—Sheet 1.
N. C. MITCHELL.
APPARATUS FOR USE IN RESTORING RUBBER.
No. 420,821. Patented Feb. 4, 1890.
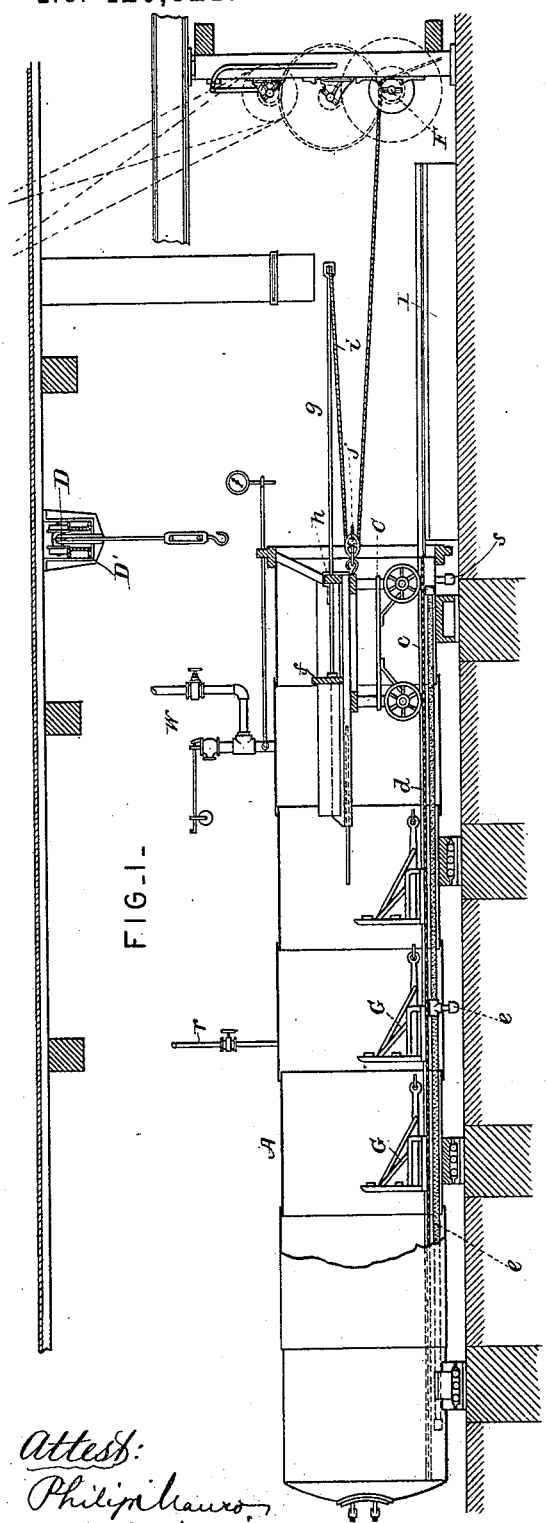
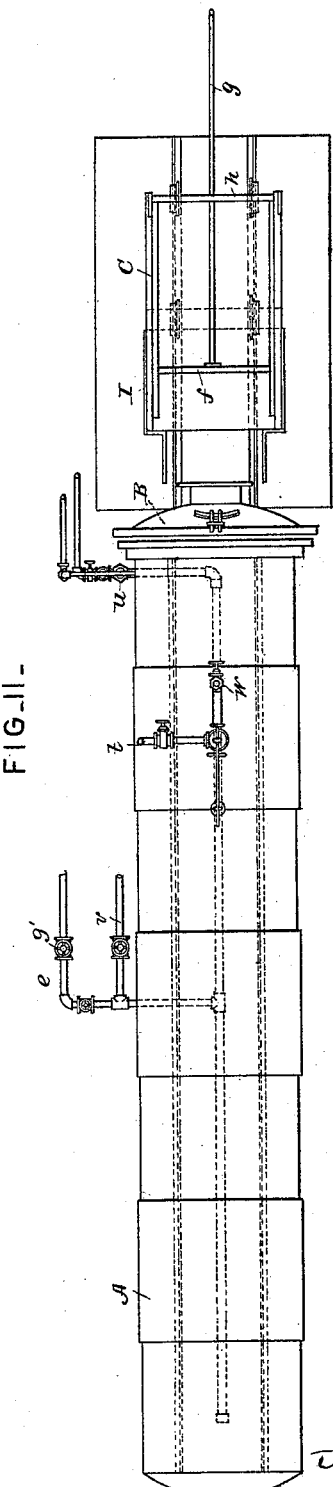

(No Model.) 2 Sheets—Sheet 2.
N. C. MITCHELL.
APPARATUS FOR USE IN RESTORING RUBBER.
No. 420,821. Patented Feb. 4, 1890.
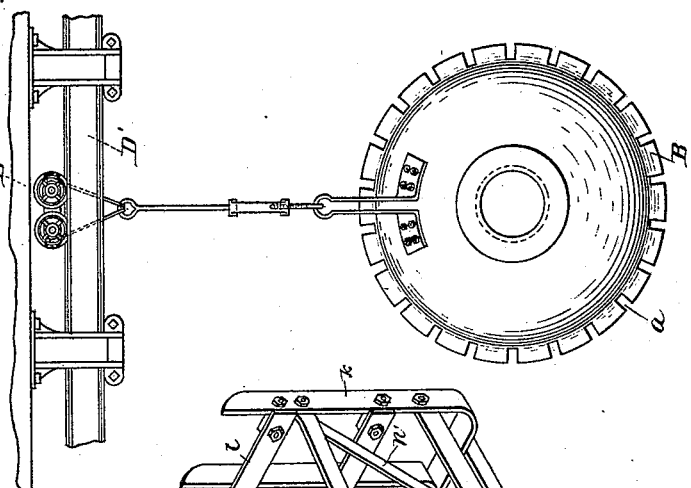
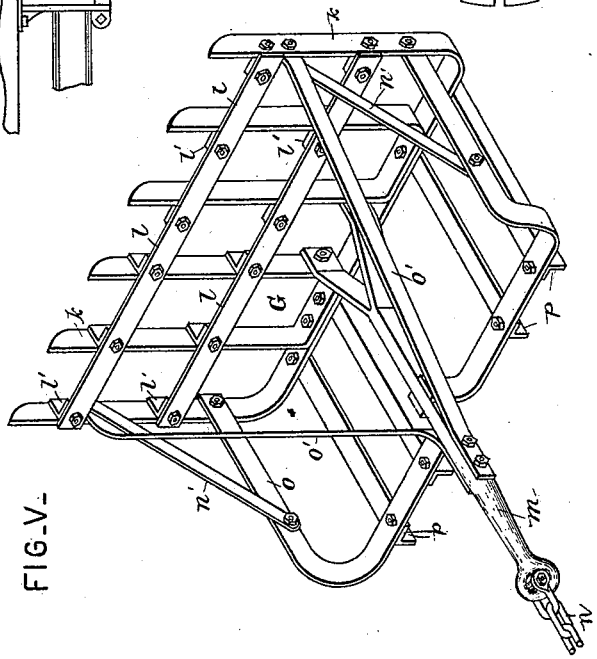
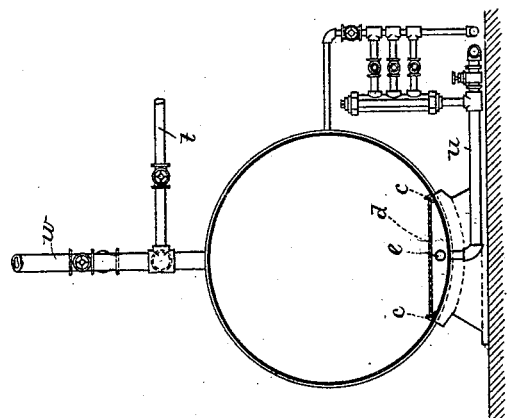

UNITED STATES PATENT OFFICE.

NATHANIEL C. MITCHELL, OF PHILADELPHIA, PENNSYLVANIA.

APPARATUS FOR USE IN RESTORING RUBBER.

SPECIFICATION forming part of Letters Patent No. 420,821, dated February 4, 1890.

Original application filed September 20, 1889, Serial No. 324,583. Divided and this application filed November 23, 1889. Serial No. 331,358. (No model.)

*To all whom it may concern:*

Be it known that I, NATHANIEL C. MITCHELL, of Philadelphia, in the county of Philadelphia and State of Pennsylvania, have invented a new and useful Improvement in Apparatus for Use in Restoring Rubber, which improvement is fully set forth in the following specification.

This invention has reference to the treatment of rubber waste—such as old boots and shoes—for the purpose of recovering therefrom the rubber as a marketable product.

In the recovery of rubber from rubber waste the old stock, after being ground between cracker-rolls and freed from foreign matters—as metal, sand, and fiber—is exposed to the action of heat, preferably steam-heat, for the purpose of devulcanization, and it is to this portion of the operation—namely, the devulcanization and desulphurization of the rubber—that the present invention has particular reference. The steam acts mainly to soften the rubber and has but little effect in removing the sulphur. I have discovered that desulphurization may be effected by mixing with the rubber a small quantity of sulphide of calcium previously to the treatment with steam. When calcium-sulphide is used alone, it requires a very high degree of heat to effect desulphurization, which high degree of heat dries the rubber to an injurious extent. It is therefore desirable to mix with the calcium-sulphide some substance which will keep the rubber in a moist condition. For this purpose it is preferred to use heavy petroleum. I usually employ seven pints of the mixture of petroleum and sulphide of calcium to two hundred pounds of rubber scrap, and seven pints of the fluid contains one-quarter of a pound of the sulphide.

This application, which is a division and continuation of my application, Serial No. 324,583, filed September 20, 1889, includes a devulcanizer of special construction, as well as apparatus employed in charging and discharging the same.

It has heretofore been a very tedious and difficult operation to fill the devulcanizer with a full charge of rubber, and a still more difficult one to remove the charge after treatment, inasmuch as the rubber becomes compacted and set by the action of the steam. It has been customary to introduce the rubber in pans or vessels which rest upon a wagon or truck rolled into the devulcanizer; but by this means, in addition to the difficulty of handling, it is impossible to utilize anything like the full capacity of the devulcanizer or to direct the steam through all parts of the mass.

It is an object of this invention to effect the devulcanization in bulk—that is to say, with the rubber charged directly into the cylinder and resting on the bottom thereof—which has never before been accomplished, so far as I am aware. By so doing a more thorough and uniform distribution of the steam can be effected, and when it is desired to draw air through it, as presently described, this can be accomplished without difficulty. It would be obviously impracticable to maintain such a circulation through all parts of a mass contained in pans, and the result would not be uniform.

The devulcanizer employed by me is a long cylinder disposed horizontally, about five feet in diameter, and having a capacity of, say, from sixteen thousand to twenty-eight thousand pounds, more or less. It is provided with a perforated false bottom for admission and distribution of the steam, and a pair of rails extend lengthwise of the cylinder. On these rails are run a series of hooks somewhat similar to inverted rakes, and formed each of metal bars with spaces between for the circulation of the steam. In charging, one of these hooks, to the end of which is attached a chain, is placed at the end of the cylinder, and a car or truck filled with rubber to be treated is run in and its load emptied into the cylinder by means of a follower on the car actuated by apparatus outside of the cylinder. This is repeated until the cylinder is filled to a height of, say, four or five feet, when a second hook is introduced, and so on until the cylinder is fully charged and the rubber fills it solidly from end to end and to within a short distance of the top. The cylinder is provided with a removable head, which is now swung into place and secured by bolts. Steam is then turned on and the valves adjusted to maintain a pressure of from one hundred to one hundred and twenty pounds. Under these conditions the hydrocarbon oil combines with the rubber and the sulphide of calcium removes the free sulphur, combining with it to form persulphide of calcium. This is, to a large extent, removed in the water of condensation. According to the present invention there is a constant circulation of steam through the devulcanizer, the steam passing through the perforations in the false bottom (by which it is diffused uniformly through the mass of rubber) and escaping through a suitable pipe which leads to a condenser. After the operation has continued a sufficient time—say for thirty-six hours—the cylinder is blown off from the top and bottom valves, and so soon as the pressure is reduced to the normal a vacuum-pump is connected with a suitable pipe opening, preferably, into the bottom of the cylinder, drawing air through the mass of rubber from top to bottom. The operation of drawing air through the rubber continues for about sixty minutes, and thereby much time is saved in drying, to effect which the residual heat of the devulcanizer is thus utilized and the latter, moreover, is partly cooled down. The next step is the removal of the devulcanized rubber, which is effected by drawing out successively the several hooks, each hook carrying in front of it a mass of rubber, which is immediately broken up and passed through the disintegrating-rolls. The use of the perforated false bottom and the uniform distribution of the heat thereby effected is particularly advantageous, in that it prevents unequal expansion and contraction of the devulcanizer, which, in a vessel of such dimensions, it is of great importance to avoid. Moreover, as the steam is constantly passing in and out, the temperature of the devulcanizer at the top is practically the same as at the bottom.

In order that the said invention may be fully understood, I will proceed to describe the same in connection with the accompanying drawings, which illustrate apparatus constructed in accordance with the said invention.

Figure I is a side elevation of a devulcanizing apparatus constructed in accordance with the invention, the cylinder being partly broken away to show the interior. Fig. II is a plan view thereof, and Fig. III a cross-section of the cylinder. Fig. IV illustrates in elevation the removable head; and Fig. V is a perspective view of one of the discharge-hooks on a larger scale than the other figures.

A represents the devulcanizer. It is provided with a head B, which, instead of being hinged to the vessel, preferably should be entirely separate therefrom, and during the process of loading and unloading can be swung out of the way by means of an overhead carrier D, which runs on a track D'. The head is secured in place during the process of devulcanization by means of a series of bolts, which are let into radial slots $a$ in the periphery of head B and corresponding slots in the flanged end of cylinder A. Rails $c$ are laid lengthwise of the cylinder, and between them is the perforated false bottom $d$ for distributing the steam, which is supplied from the boiler by a pipe $e$. Pipe $e$ runs under the bottom $d$ from end to end of the cylinder. (See Fig. II.) A car or truck C is arranged to run on rails $c$ into the interior of cylinder A, and by means of this car or truck the operation of charging is carried on. The car C is provided with a follower $f$, extending lengthwise across the body thereof, and adapted to push off the load of rubber from the forward end. The follower $f$ is attached to a rod $g$, which passes through a guide-hole in in the tail-board $h$ of the car. To the outer end of rod $g$ is attached a rope $i$, which passes over a pulley $j$ on car C, and then over a pulley F, being attached at its end to a windlass, (not shown in the drawings,) by means of which the follower $f$ can be pushed forward, discharging its load of rubber scraps into the devulcanizer.

The construction of the hooks G is shown in Fig. V. The hook is somewhat similar in form to an inverted rake. It is composed mainly of stout bars of wrought-iron about half an inch thick and two inches wide. The rear or upright portion of the hook is formed of bars $k$ bent into U shape. These are firmly braced by cross-bars $l$, which are secured to the vertical bars by angle-irons $l'$. The tongue $m$ is bolted at its rear end to the uprights and at its forward end has an eye, to which is attached a draft-chain $n$. The side pieces $o$ are bolted at one end to the outer uprights $k$ and at the other to the shank of tongue $m$. Additional oblique braces $n'$ and $o'$ are provided to strengthen the structure. The bottom pieces $p$ also constitute runners for sliding the hooks over rails $c$. The whole structure is open, so as not to interfere with the circulation of the steam, and while comparatively light and occupying small space within the devulcanizer, has ample strength for the work required.

The method of charging the cylinder A is clearly shown in Fig. I. The first hook G being placed in position in the extreme end of the cylinder, the space over and in front of it is filled by means of car C for a distance lengthwise of the cylinder, say, of five feet. Another hook is then placed in position, and the charging proceeds as before. When the cylinder is charged to its utmost capacity, the rubber filling it in a continuous mass from end to end, platform I at the mouth of the cylinder is removed, head B is swung into place and securely bolted to the cylinder. Steam is then turned on through pipe $e$ by means of cock $g'$ and is admitted to the space beneath false bottom $d$, and by the perforations in the latter it is diffused through all parts of the mass of rubber. The steam-exit pipe $r$ is always open, so that the steam is constantly circulating through the cylinder instead of remaining stagnant therein. This is found to be an important improvement and renders the operation of devulcanization much more thorough. Moreover, it reduces the amount of condensation in the cylinder. The water of condensation formed therein is collected in the space beneath the perforated bottom, which space is constantly drained by pipe $s$, which is provided with a steam-trap to prevent the escape of steam. To facilitate the drainage, the cylinder is preferably slightly inclined toward its forward end. When the operation of devulcanization is complete, pipe $e$ is closed and exhaust-pipes $t$ and $u$ are opened, blowing off the steam at both top and bottom. When the pressure-gage indicates zero, pipe $v$, which leads to the bottom of the cylinder and is connected with steam-pipe $e$, is opened and a vacuum-pump put into operation, by mean of which heated air is drawn into the cylinder through pipe $W$, leading to the top thereof. The air is drawn through the mass of rubber from top to bottom, removing a great portion of the moisture. When it enters the cylinder, which is at a very high temperature within, the air is still further heated thereby, thus performing its work more efficiently. In addition to the utilization of the residual heat of the devulcanizer to dry the rubber, this operation is advantageous in that it reduces the temperature of the latter to such an extent that when the head B is removed the workmen can at once proceed to withdraw the hooks G. Prior to the adoption of this plan it required about five hours to blow off the cylinder, and even then, when the head was removed, considerable steam remained, and the heat was so intense that the operation of discharging could not begin for some time. Now the whole operation subsequent to the shutting off of the steam requires only two hours and a half. When the head B is removed, the movable platform I is again rolled to the mouth of the cylinder, the draft-chain $n$ of the first hook is hooked onto the chain attached to the windlass, and the hook drawn onto the platform, carrying with it the mass of rubber in front of its prongs. This mass is in a compact lump, which is broken up into smaller pieces and removed by trucks to the cracker-rolls for disintegration prior to drying and sheeting. The next hook is drawn out in like manner, and so on with all the others until the cylinder is empty.

I have given in the foregoing description what is regarded as the best mode of carrying the invention into effect; but I wish it to be understood that the said invention is not limited to the precise details described, which could obviously be modified or varied within wide limits without departing from the principles of the invention. It is further obvious that some of the improvements described could be omitted, though to obtain the best results it is desirable to employ the invention in its entirety.

I do not herein claim the processes or methods above described, which form the subject-matter of my said application, Serial No. 324,583.

Having now fully described my said invention, what I claim, and desire to secure by Letters Patent, is—

1. The devulcanizing apparatus comprising a cylinder having a perforated false bottom and a steam-inlet beneath the false bottom, substantially as described.

2. The devulcanizing apparatus comprising a cylinder having a perforated false bottom, a steam-inlet beneath the same, and a steam-outlet pipe leading from the space above the false bottom, substantially as described.

3. The devulcanizer comprising a cylindrical vessel having a steam-inlet, and provided with blow-off pipes near the top and bottom, respectively, substantially as described.

4. The devulcanizer having a perforated false bottom and a drain-pipe leading from the space beneath the false bottom, substantially as described.

5. In combination with the devulcanizer having rails extending lengthwise thereof, the loading-truck adapted to run on said rails, and having a follower movable lengthwise of the body of the truck for discharging its contents, substantially as described.

6. The combination of the cylinder having rails lengthwise thereof, the removable platform at the mouth of the cylinder having corresponding rails, the loading-truck adapted to run on said rails, the discharging-follower, and a rope for actuating said follower from outside the cylinder, substantially as described.

7. The combination, with the loading-truck, of a follower movable lengthwise thereof, a rod attached to said follower, and a chain connected with said rod and passing over a pulley carried by said truck, substantially as described.

8. The combination, with the devulcanizer, of a series of discharge-hooks for removing the devulcanized rubber, substantially as described.

9. The combination, with the devulcanizer, of discharge-hooks formed of metal bars with spaces between, through which spaces the steam can pass freely, substantially as described.

10. The combination, with the devulcanizer having longitudinal rails, of a series of hooks provided with runners for sliding on said rails, substantially as described.

11. The discharging-hook having a horizontal and a vertical portion formed of metal bars bolted together and braced, and a tongue for the attachment of a draft-chain, substantially as described.

12. The discharging device comprising a series of vertical prongs formed of U-shaped iron bars, side bars, a tongue, and bottom pieces constituting runners, the parts being all firmly bolted together and braced, substantially as described.

In testimony whereof I have signed this specification in the presence of two subscribing witnesses.

NATHANIEL C. MITCHELL.

Witnesses:
EDWARD M. MUNDY,
JOEL H. LEEDS.